United States Patent [19]

Fifield et al.

[11] Patent Number: 5,886,688

[45] Date of Patent: Mar. 23, 1999

[54] INTEGRATED SOLAR PANEL AND LIQUID CRYSTAL DISPLAY FOR PORTABLE COMPUTER OR THE LIKE

[75] Inventors: David Fifield, San Jose; Walter K. Hurwitz, Sunnyvale, both of Calif.

[73] Assignee: National Semiconductor Corporation, Santa Clara, Calif.

[21] Appl. No.: 458,383

[22] Filed: Jun. 2, 1995

[51] Int. Cl.[6] .................................................. G09G 5/00

[52] U.S. Cl. ............................ 345/206; 345/207; 345/211

[58] Field of Search .............................. 345/87, 211, 214, 345/207, 204, 205, 206, 38, 50, 52, 33, 34, 43, 44, 48, 82; 136/244, 252, 256; 368/205, 242; 194/319; 364/706, 707

[56] References Cited

U.S. PATENT DOCUMENTS 4,400,577  8/1983  Spear .......................................... 136/259

*Primary Examiner*—Xiao Wu
*Attorney, Agent, or Firm*—Skjerven, Morrill, MacPherson, Franklin, & Friel; Edward C. Kwok; Glen B. Choi

[57] ABSTRACT

The present apparatus is for use in for example, a personal digital assistant (PDA) laptop computer, personal computer, watch or the like, and in one embodiment includes a transparent or semitransparent liquid crystal display disposed over a solar cell array, and in another embodiment includes a transparent or semitransparent solar cell array disposed over a liquid crystal display. In yet another embodiment, alternate display units and solar cell array units are positioned on a substrate.

3 Claims, 3 Drawing Sheets

INTEGRATED SOLAR PANEL AND LIQUID CRYSTAL DISPLAY FOR PORTABLE COMPUTER OR THE LIKE

FIELD OF THE INVENTION

This invention relates to powering of personal digital assistants (PDA's) or the like, and more particularly, to the use of solar cells for supplying such power.

BACKGROUND OF THE INVENTION

The desirability of a personal digital assistant (PDA), hand held computer, laptop computer, calculator, watch or the like powered by solar cells is readily apparent. Such a device might include, for example, a liquid crystal display and a solar cell array physically separate and removed from the display during the powering operation. That is, for example, the solar cell array may be included within a lid of the device, which in a closed condition covers the liquid crystal display and other operating elements of the device. Upon opening the lid the solar cell array within the lid becomes exposed to light and the liquid crystal display becomes exposed to the user, with the solar cell array then powering the liquid crystal display and/or charging a battery of the device. The solar cell array of course may power the internal electronics of the device.

As another example the display and solar cell array may be in fixed side-by-side relation.

While such approaches are workable, it will be seen that the exposed solar cell array and display take up a relatively large area as the device is operated.

A device of this general type is shown in U.S. Pat. No. 5,339,091 to Yamazaki et al, entitled "Paperless Portable Book", issued Aug. 16, 1994. As shown therein, the device includes a solar cell array which can receive sunlight from both sides of a lid so that power generation can continue with the lid opened or closed. However, with the lid of the device closed, the display and other elements of the device are blocked from view by the user.

Reference is made to U.S. Pat. No. 5,260,885 to Ma, entitled "Solar Power Operated Computer", issued Nov. 9, 1993. As disclosed therein, the device has an upper casing and a base, each having a solar cell assembly respectively hinged thereto to collect radiant energy. The device is in a compact stack in its folded up condition, and when unfolded the solar cell assemblies extend outward. Thus, the same problem arises.

U.S. Pat. No. 5,331,434 to Kikinis, entitled "Integrated Computer Scanning System", issued Jul. 19, 1994, discloses a photovoltaic film provided with a computer which allows the computer to be used as a scanner as well as a conventional computer. The photovoltaic cell is transparent and is applied directly to the display screen of the computer system, but does not generate power for the device.

SUMMARY OF THE INVENTION

The present invention includes placement of a transparent or semitransparent liquid crystal display or other chosen display technology over transparent, semitransparent or non-transparent solar cells, so that upon exposure to light, the light passes through the display and to the solar cells.

In another embodiment, a transparent or semitransparent solar cell array is disposed over a transparent, semitransparent or non-transparent liquid crystal display or other chosen display technology so that the display is viewable through the solar cell array.

In yet another embodiment, a plurality of solar cell units and display units are disposed on a substrate in a row which includes alternate display units and solar cell units.

DESCRIPTION OF THE PREFERRED EMBODIMENTS

Figure 1:
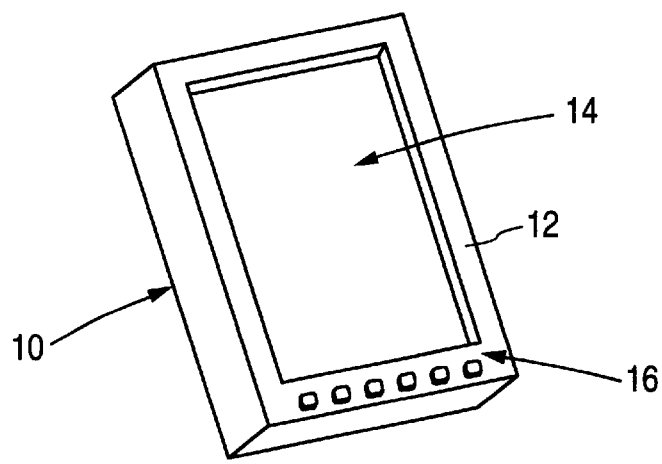
FIG. 1 is a prespective view of a PDA incorporating the present invention.
Figure 2:
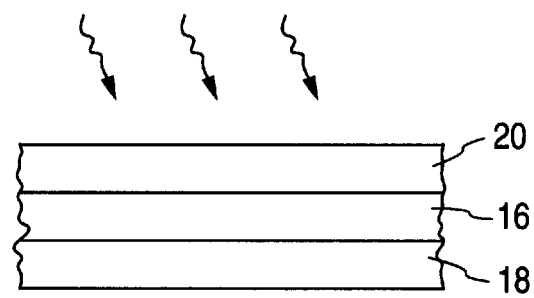
FIG. 2 is a sectional view of a portion of the device of FIG. 1, showing a first embodiment of the invention.

Shown in FIG. 1 is a device shown as a PDA unit 10. It will be understood that such device shown is an example and may take the form of a laptop computer, hand held computer, calculator, watch or the like. The PDA 10 includes a case 12, a display area 14, and controls 16. In the embodiment of FIG. 2, the display area includes a transparent or semitransparent (i.e., allowing some incident light therethrough) liquid crystal display 16 disposed over a transparent, semitransparent or non-transparent solar cell array 18. Glass or plastic 20 may cover the liquid crystal display 16 for protection. It will be understood that the liquid crystal display 16 and solar cell array 18 can be in sandwiched relation or can be an integrated structure.

Normal operating connections between the liquid crystal display 16 and solar cell array 18 are provided, and of course normal connections may be provided from the solar cell array 18 to the internal electronics of the device 10.

In use, it will be seen that upon incident light reaching the liquid crystal display 16,through the protective glass or plastic 20, at least some of that light will pass through the liquid crystal display 16, (which is transparent or semitransparent) to the solar cell array 18. The solar cell array 18 will in turn power the liquid crystal display 16 (or partially power the device 10, which may include battery, or trickle charging such battery) and, if chosen, other electronics of the device 10.

It will readily be seen that the device 10 is always in a state wherein it is ready for operation, provided there is sufficient light for such operation. The device 10, in use, achieves a degree of compactness not achieved in the above-described systems because of the overlapping relation of the display 16 and solar cell array 18.

Is to be understood that the display need not be a liquid crystal display but can, for example, be a fluorescent display, an active matrix display, an LED display or the like.

Figure 3:
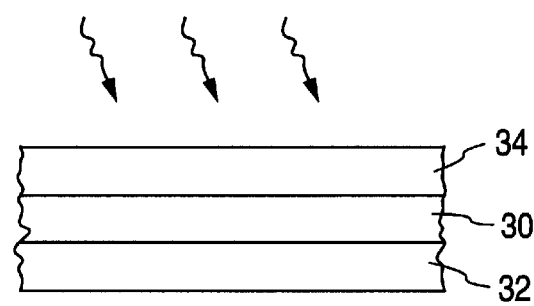
FIG. 3 is a sectional view of a portion of the device of FIG. 1, showing a second embodiment of the invention.

FIG. 3 shows another embodiment of the invention, in this case, with the solar cell array 30 being transparent or semitransparent, and positioned over a transparent, semi-transparent or non-transparent liquid crystal display 32. Again, the solar cell array 30 and liquid crystal display 32 can be in sandwiched relation, or may be an integrated structure. In addition, it will be understood that glass or plastic 34 can overlie the solar cell array 30 for protection thereof.

In this embodiment, upon light reaching the solar cell array 30, the liquid crystal display 32 (and other elements of the device 10 as chosen) are powered, but the solar cell array 30 is sufficiently transparent so that the liquid crystal display 32 can be viewed therethrough. Thus, the advantages attendant to the first-described embodiment apply here.

Again, the display may be a fluorescent display, an active matrix display, an LED display, or the like.

Figure 5:
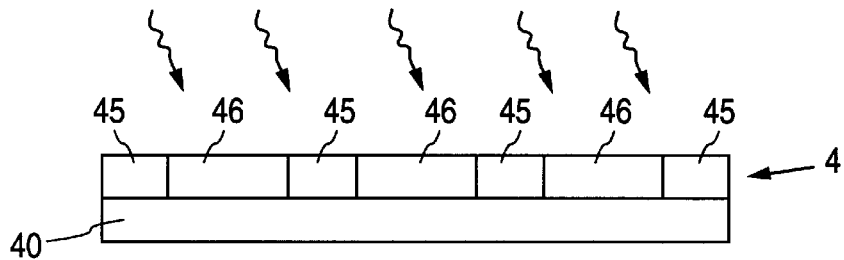
FIG. 5 is a sectional view taken along the line 5—5 of FIG. 4.
Figure 4:
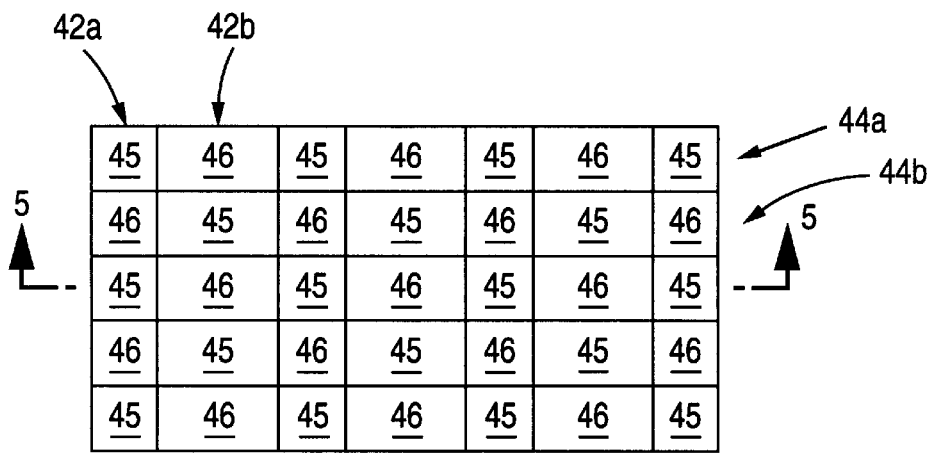
FIG. 4 is a plan view of a portion of the device of FIG. 1 of a third embodiment of the invention.

FIGS. 4 and 5 show yet another embodiment of the invention. As shown therein, a substrate 40 is provided, and a plurality of columns 42a, 42b . . . and rows 44a, 44b . . . of elements are provided thereon. Each row, for example, row 42a, includes alternate display units (for example, with advantage, LED's or active matrix display units) and solar cell units 45, 46 respectively disposed therealong. Each column, for example, column 44a, is arranged in the same way, i.e., solar cell units 46 alternate with display units 45.

Again, the solar cell units 46 are operationally connected to the display units 45 for appropriate full or partial powering thereof and/or charging of a device battery.

It will be understood that the sizing of the display units 45 and solar cell units 46 need not be uniform (FIGS. 4 and 5). Rather, the sizes can be optimized to provide a chosen display quality as balanced against power generated by the solar cell units. It is also understood that these units can be sized to provide that the display units are of pixel size, if chosen.

Figure 6:
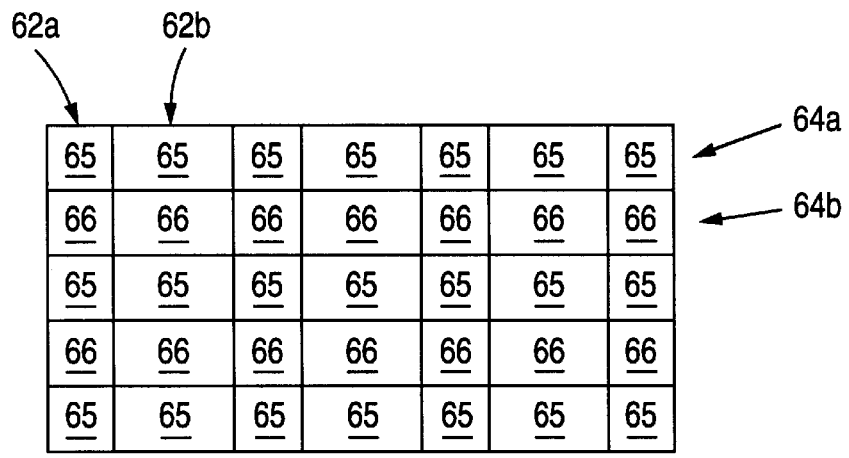
FIG. 6 is a plan view of a portion of the device of FIG. 1 of a fourth embodiment of the invention.

Shown in FIG. 6 is yet another embodiment of the invention. Again, a substrate 40 as in FIG. 5 is provided, and a plurality of columns 62a, 62b . . . and rows 64a, 64b . . . of elements are provided. Each column (for example column 62a) includes alternate display units 65 (for example, again with advantage, LEDs or active matrix display units) and solar cell units 66 respectively disposed therealong. However, each row, for example, row 64a, includes only either display units 65 or solar cell units 66.

Figure 7:
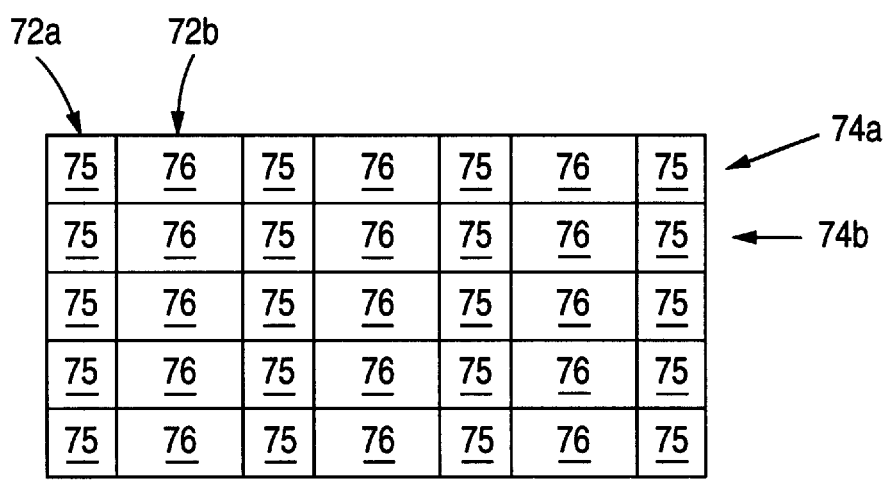
FIG. 7 is a plan view of a portion of the device of FIG. 1 of the first embodiment of the invention.

FIG. 7 shows yet another embodiment of the invention. Again, a substrate 40 as in FIG. 5 is provided, and a plurality of columns 72a, 72b . . . and rows 74a, 74b . . . of elements are provided thereon. In this embodiment, each row, for example, row 74a, includes alternate display units 75 (for example, with advantage, LEDs or active matrix display units) and solar cell units 76 respectively disposed therealong. Meanwhile, each column, for example column 72a, is arranged so that only either display units 75 or solar cell units 76 are provided therein.

It will readily be seen that a device in which any of the embodiments of FIGS. 1–7 is used is always in a state wherein it is ready for operation.

We claim:

1. A display assembly comprising:

a substrate;

a plurality of display units positioned on the substrate; and a plurality of solar cell units positioned on the substrate and interspersed among the display units;

wherein a plurality of display units and solar cell units are arranged in a row on the substrate, and the solar cell units are in alternating relation with the display units.

2. The display assembly of claim 1 further comprising additional rows of such solar cell units and display units, each additional row including solar cell units and display units in alternate relation.

3. A display assembly comprising:

a substrate;

a plurality of display units positioned on the substrate; and a plurality of solar cell units positioned on the substrate and interspersed among the display units;

wherein a plurality of display units and solar cell units are arranged in a column on the substrate, and the solar cell units are in alternating relation with the display units.

\* \* \* \* \*